United States Patent
Fritz

(10) Patent No.: US 11,015,670 B2
(45) Date of Patent: May 25, 2021

(54) VIBRATION DAMPER

(71) Applicants: THYSSENKRUPP BILSTEIN GMBH, Ennepetal (DE); thyssenkrupp AG, Essen (DE)

(72) Inventor: Michael Fritz, Breckerfeld (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 83 days.

(21) Appl. No.: 16/072,092

(22) PCT Filed: Jan. 24, 2017

(86) PCT No.: PCT/EP2017/051387
§ 371 (c)(1),
(2) Date: Jul. 23, 2018

(87) PCT Pub. No.: WO2017/129545
PCT Pub. Date: Aug. 3, 2017

(65) Prior Publication Data
US 2019/0032742 A1    Jan. 31, 2019

(30) Foreign Application Priority Data
Jan. 29, 2016    (DE) .................... 20 2016 100 438.1

(51) Int. Cl.
*F16F 9/32* (2006.01)
*F16F 9/06* (2006.01)
*F16F 9/19* (2006.01)

(52) U.S. Cl.
CPC ............ *F16F 9/3242* (2013.01); *F16F 9/064* (2013.01); *F16F 9/19* (2013.01); *F16F 2222/12* (2013.01);
(Continued)

(58) Field of Classification Search
CPC .. F16F 9/3242; F16F 9/19; F16F 9/064; F16F 2222/12; F16F 9/22; F16F 2234/02;
(Continued)

(56) References Cited

U.S. PATENT DOCUMENTS 3,868,097 A * 2/1975 Taylor ...................... F16F 5/00
267/124
4,628,579 A * 12/1986 Taylor ...................... F16F 5/00
188/282.5

(Continued)

FOREIGN PATENT DOCUMENTS

DE          16 62 421 U     8/1953
DE    20 2005 021 063 U     1/2007
(Continued)

OTHER PUBLICATIONS

Translation of German Patent No. DE 102007024336 obtained from website: https://worldwide.espacenet.com on Nov. 17, 2020.*
(Continued)

*Primary Examiner* — Pamela Rodriguez
(74) *Attorney, Agent, or Firm* — thyssenkrupp North America, LLC

(57) ABSTRACT

A vibration damper may include a damper tube and a damper piston disposed in the damper tube so as to be reciprocatingly movable. The damper tube may be connected to a piston rod extending out of the damper tube, and the damper piston may movably separate a first oil-filled damper chamber on a piston rod side from a second oil-filled damper chamber remote from the piston rod. A bottom element at one end of the damper tube seals the end of the damper tube. The bottom element may protrude into the end of the damper tube and thereby reduce oil volume of the second damper chamber.

16 Claims, 1 Drawing Sheet

(52) U.S. Cl.
CPC ... *F16F 2230/0005* (2013.01); *F16F 2230/04* (2013.01); *F16F 2234/02* (2013.01); *F16F 2238/04* (2013.01)

(58) Field of Classification Search
CPC ........... F16F 2230/04; F16F 2230/0005; F16F 2238/04; F16F 5/00
USPC ......................... 267/64.13, 64.28, 127, 129
See application file for complete search history.

(56) References Cited

U.S. PATENT DOCUMENTS

| | | | | |
|---|---|---|---|---|
| 2004/0144605 A1* | 7/2004 | Thurmann | ................ | F16F 9/38 188/322.19 |
| 2006/0042895 A1* | 3/2006 | Mangelschots | ....... | F16F 9/3242 188/322.19 |
| 2010/0072010 A1* | 3/2010 | Aramizu | ................... | F16F 5/00 188/300 |
| 2016/0101662 A1* | 4/2016 | Konakai | ................... | F16F 9/36 188/315 |

FOREIGN PATENT DOCUMENTS

| | | |
|---|---|---|
| DE | 102007024336 A | 11/2008 |
| DE | 10 2007 025 733 A | 12/2008 |
| DE | 10 2010 031 088 A | 1/2012 |
| EP | 2 123 932 A | 11/2009 |
| EP | 2 249 057 A | 11/2010 |
| FR | 2 044 525 A | 2/1971 |
| FR | 2418 391 A | 9/1979 |
| FR | 2 993 623 A | 1/2014 |

OTHER PUBLICATIONS

English Translation of International Search Report issued in PCT/EP2017/051387, dated Apr. 13, 2017 (dated Apr. 25, 2017).

* cited by examiner

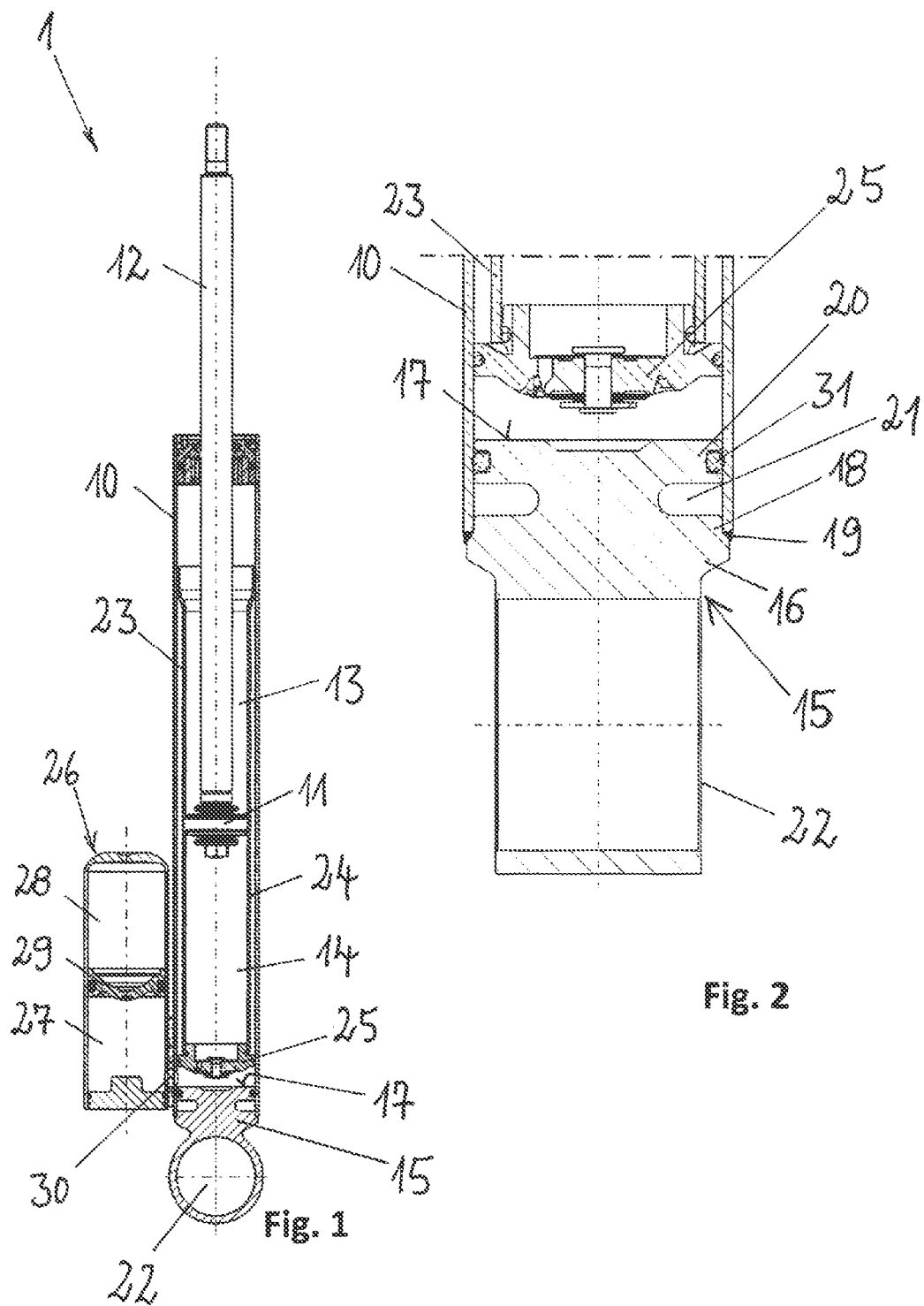

VIBRATION DAMPER

CROSS REFERENCE TO RELATED APPLICATIONS

This application is a U.S. National Stage Entry of International Patent Application Serial Number PCT/EP2017/051387, filed Jan. 24, 2017, which claims priority to German Patent Application No. DE 20 2016 100 438.1, filed Jan. 29, 2016, the entire contents of both of which are incorporated herein by reference.

FIELD

The present disclosure generally relates to vibration dampers, including vibration dampers for the chassis of a vehicle.

BACKGROUND

DE 10 2007 025 733 A1 discloses a vibration damper which is configured for use in a chassis of a vehicle, with a damper tube and a damper piston which is arranged in the damper tube so as to be reciprocatingly movable and which is connected to a piston rod. The piston rod extends out of the damper tube via a seal package, and the damper piston separates a first oil-filled damper chamber on the piston rod side from an opposite, second oil-filled chamber remote from the piston rod. If a retraction and extension movement is introduced into the piston rod, the damper piston moves through the oil-filled damper chamber and the first damper chamber is reduced in size, whereby the second damper chamber is enlarged by the same volume amount, which evidently also applies conversely. For reasons of simpler production, the damper tube has an open end which is closed by a bottom element. The bottom element is connected to a mounting eye and the vibration damper is arranged between the vehicle superstructure and the wheel-axle unit of the vehicle, in that the free end of the piston rod extending from the damper tube is connected to the vehicle superstructure, wherein the mounting eye serves to receive the wheel-axle unit.

In order to balance the volumes as the piston rod extends and retracts, a gas chamber is provided which is isolated by a separating piston and located adjacent to the second damper chamber remote from the piston rod; the separating piston travels in the direction towards the gas chamber and reduces this when the piston rod is introduced into the damper tube, then the separating piston moves in the direction towards the second damper chamber when the piston rod is extended again, and the volume of the gas chamber can increase again. The gas chamber lies axially adjacent to the second damper chamber, so that the overall installation length of the vibration damper is increased by the arrangement of the gas chamber. Depending on specifications often imposed by the installer in relation to installation length of the vibration damper, the gas chamber must be relocated from the damper to an external compensation unit, so that the installation length of the vibration damper is not increased by the arrangement of the gas chamber.

EP 2 249 057 A1 for example discloses a vibration damper of the type concerned here with an external compensation unit containing a gas chamber, a separating piston and an oil chamber. The oil chamber is isolated from the gas chamber by the separating piston, and the oil chamber is fluidically connected to the second damper chamber via a line. A bottom valve is arranged at the base of the second damper chamber, and oil flows through this bottom valve as it enters the oil chamber and as it overflows back to the second damper chamber from the oil chamber. The bottom valve is adjacent to a transitional chamber which could be regarded as part of the second damper chamber, and the transitional chamber is terminated at the bottom by a bottom element which terminates the damper tube towards the mounting eye.

Disadvantageously, the volume of the second damper chamber is unnecessarily enlarged by the required transitional chamber. The need for a compensation volume, in particular as provided by the gas chamber in the compensation unit, grows as the oil quantity in the vibration damper increases, so it is desirable to keep the total oil volume of the vibration damper as small as possible. The volume of the oil in the oil chamber must have a minimum volume which corresponds at least to the volume of the retracting and extending piston rod. The separating piston in the compensation unit travels along a path, so that the volume compensation can take place via the travel path. The greater the total oil volume, the greater the compensation volume of the gas chamber must be, since also temperature differences of for example −40° C. to +120° C. must be taken into account which cause the oil to expand correspondingly greatly, and this expansion must also be compensated by the gas chamber.

Thus a need exists for a vibration damper with a shorter installation length and minimized oil volume.

BRIEF DESCRIPTION OF THE FIGURES

FIG. 1 is a cross-sectional view of an example vibration damper with a bottom element.

FIG. 2 is a detail view of an arrangement of an example bottom element at an end in a vibration damper.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a vibration damper, which can be used in the chassis of a vehicle, for example, with a damper tube and a damper piston which may be arranged in the damper tube so as to be reciprocatingly movable and may be connected to a piston rod that extends out of the damper tube. In some examples, the damper piston movably separates a first oil-filled damper chamber on the piston rod side from a second oil-filled damper chamber remote from the piston rod. A bottom element may be arranged at one end of the damper tube and seals an open end of the damper tube.

In some examples, a bottom element may be formed by a solid component that protrudes into an end of a damper tube and thereby reduces oil volume of a second damper chamber.

The concept of the invention is aimed at an optimized bottom element which is configured such that the oil volume of the second damper chamber is minimized as far as possible, whereby finally the oil volume of the total vibration damper is reduced, which leads to a smaller necessary gas compensation volume. For this, the floor element is formed as a solid component, wherein a solid component in the sense of the present invention means any component which is not produced from the starting material of a sheet metal element in the punching and bending process, the deep-drawing process or other surface-forming processes. For example, the solid component is an injection molding, a metal die-casting, a forging, an extrusion or other casting. In particular, the solid component has structural constituents with different thicknesses. The solid component may in particular be made from a solid starting material by machining with material removal.

By designing the bottom element as a solid component, a volume is taken up by the bottom element, which reduces the free volume of the damper chamber for the oil. The resulting reduction in the second damper chamber is achieved in particular in that the bottom element protrudes in portions into the end of the damper tube, and hence the oil volume of the second damper chamber is reduced by the solid structure. It is particularly advantageous if the bottom element has a surface which is formed substantially flat and delimits the second damper chamber. The substantially flat form of the surface here covers at least a majority of the surface of the bottom element which extends in a plane, so that depressions, shoulders and similar may be made in the surface of the bottom element. The bottom element is formed substantially rotationally symmetrical about a center axis, wherein the center axis sits orthogonally on the surface which points in the direction towards the second damper chamber. The casing surface of the bottom element, which e.g. is cylindrical, sits in the damper tube and the surface of the bottom element terminates the second damper chamber in a plane which lies significantly inside the end of the damper tube.

Further advantageously, the bottom element has a peripheral welding collar via which the bottom element is welded to the end of the damper tube by means of a weld seam. The welding collar may form a circumferential shoulder on which the end of the damper tube is brought to rest, in order finally to create the weld seam around the entire circumference and weld the end of the damper tube to the bottom element.

Further advantageously, the bottom element has a peripheral sealing collar which protrudes into the damper tube and receives a sealing element which is arranged tightly against the inside of the damper tube. The circumferential sealing collar lies closer to the surface of the bottom element which points in the direction towards the second damper chamber, wherein the surface may be terminated at the edge by the sealing collar. The sealing element is in particular formed as an O-ring seal and on the outside sits in a groove arranged in the casing surface of the sealing collar. In other words, the sealing collar protrudes further into the damper tube than the welding collar, so that by the protrusion of the sealing collar, a further volume of the damper tube is occupied and filled with the material of the solid component.

A further advantage is achieved if a circumferential groove is made in the bottom element between the welding collar and the sealing collar, so that the welding collar and the sealing collar are formed axially separated from each other in contact with the damper tube. The circumferential sealing groove creates a thermal barrier between the welding collar and the sealing collar, so that on welding of the damper tube to the bottom element, the sealing element previously attached to the sealing collar is not damaged by the heat applied on welding. Also, the circumferential groove removes material from the substantially cylindrically formed bottom element so that weight may be saved.

According to a further advantageous embodiment of the vibration damper, a mounting eye is arranged on the bottom element, wherein the mounting eye is formed integrally with and from the same material as the bottom element. For example, the bottom element is made of a steel material, wherein it is also possible for the bottom element to be made for example from aluminum or a plastic. The unitary form with the mounting eye allows a reduction in the number of individual components and necessary joining steps, since the mounting element is formed integrally with the bottom element and hence a single joining step to the damper tube is necessary and sufficient.

An advantageous refinement of the vibration damper provides an inner tube which is received in the damper tube and extends through and concentrically to the damper tube, so that a ring gap is formed between the damper tube and the inner tube, and so that the damper piston is guided in the inner tube. Here, a bottom valve is arranged on the bottom end of the inner tube, and receives the end of the inner tube and supports this at least radially against the damper tube. The bottom valve is thus located inside the second oil-filled damper chamber remote from the piston rod, so that the bottom valve is located between the damper piston and the bottom element.

The vibration damper may be refined such that this has an external compensation unit on the damper tube, comprising an oil chamber and a gas chamber, wherein the gas chamber is separated from the oil chamber by means of a movable separating piston and is fluidically connected to the second damper chamber via an oil passage. The external arrangement of the compensation unit reduces the necessary installation length of the vibration damper since the gas chamber does not lie adjacent to the second damper chamber in the axial direction. The oil chamber is fluidically connected via the oil passage to the second damper chamber, wherein the oil entering the oil chamber first flows through the bottom valve; the gas chamber then expands and presses the oil from the oil chamber back into the second damper chamber, so it flows through the bottom valve in the opposite direction. The bottom valve here sits on the end of the inner tube and the distance between the bottom valve and the surface of the bottom element is kept as small as possible. The axial distance between the bottom element and the bottom valve corresponds approximately to the opening diameter of the oil passage, which opening diameter must have a minimum diameter. The dimensioning of the lower end of the vibration damper begins with the mounting eye adjoining the solid part of the bottom element, wherein the damper tube, which finally contains the bottom valve, is placed on the bottom element. The distance between the bottom element and the bottom valve is limited to a minimum distance which is determined such that the oil passage may still have the necessary diameter.

FIG. 1 shows an overall view of the vibration damper 1 which is designed for example for a chassis of a vehicle. The vibration damper 1 has a damper tube 10 and a damper piston 11 which is arranged in the damper tube 10 so as to be reciprocatingly movable, and a piston rod 12 adjoins the damper piston 11 and extends from the end of the damper tube 10.

The damper piston 11 divides the interior of the damper tube 10 into a first oil-filled damper chamber 13 on the piston rod side and a second oil-filled damper chamber 14 remote from the piston rod, wherein on a movement of the damper piston 11, via the piston rod 12 inside the damper tube 10, oil flows to and fro between the damper chambers 13 and 14 through the damper piston 11.

When the piston rod 12 is retracted into the damper tube 10, it displaces part of the oil volume which is compensated by means of an external compensation unit 26. The compensation unit 26 is arranged on the outside of the damper tube 10 and has an oil chamber 27 and a gas chamber 28. The gas chamber 28 is here isolated from the oil chamber 27 by means of a movable separating piston 29. Via an oil passage 30, the oil chamber 27 is fluidically connected to the second damper chamber 14. When the piston rod 12 is retracted into the damper tube 10, the separating piston 29 moves in the direction towards the gas chamber 28 and reduces this with a simultaneous pressure rise. When the piston rod 12 then extends out of the damper tube 10 again, the gas in the gas chamber 28 expands and pushes the separating piston 29 back in the direction towards the oil-filled oil chamber 27. Thus oil flows back via the oil passage 30 from the oil chamber 27 into the second damper chamber 14.

To damp the oil flow movement between the second damper chamber 14 and the oil chamber 27, a bottom valve 25 is used which is arranged in the second damper chamber 14. The vibration damper 1 furthermore has an inner tube 23, and the inner tube 23 has a diameter which is smaller than the diameter of the damper tube 10. Consequently, a ring gap 24 is formed which is also filled with oil, and the oil in the ring gap 24 may execute a flow movement when the damper piston 11 is moved axially to and fro in the damper tube 10.

The damper tube 10, open at the end, is closed by a bottom element 15 which is formed integrally with a mounting eye 22. The bottom element 15 has a substantially cylindrical portion, and a flat face of the cylindrical portion is indicated by the surface 17 which points in the direction towards the second damper chamber 14.

FIG. 2 shows a more detailed view of the arrangement of the bottom element 15 inside the end of the damper tube 10. The figure shows an end part of the inner tube 23, and depicts the bottom valve 25 which adjoins the end of the inner tube 23; the bottom valve 25 sits centrally inside the damper tube 10 and receives the end of the inner tube 23.

The bottom element 15 protrudes into an end portion of the damper tube 10 and is welded to the damper tube 10 with a weld seam 19 via a welding collar 18. In the direction towards the surface 17, the welding collar 18 is adjoined by a sealing collar 20 which holds a sealing element 31; a groove 21, in the form of a radial depression produced from the outside, is situated between the sealing collar 20 and the welding collar 18.

The bottom element 15 is formed as a solid component 16 and made as one piece with the mounting eye 22, so that the vibration damper 1 can be connected directly to a wheel-axle unit of the vehicle by means of the bottom element 15.

The invention is not restricted in its embodiment to the preferred exemplary embodiment given above. Rather, a number of variants are conceivable which make use of the outlined solution even in embodiments of fundamentally different types. All features and/or advantages arising from the claims, the description and the drawings, including structural details or spatial arrangements, may be essential to the invention both alone and in widely varying combinations.

LIST OF REFERENCE SIGNS

1 Vibration damper
10 Damper tube
11 Damper piston
12 Piston rod
13 First damper chamber
14 Second damper chamber
15 Bottom element
16 Solid component
17 Surface
18 Welding collar
19 Weld seam
20 Sealing collar
21 Groove
22 Mounting eye
23 Inner tube
24 Ring gap
25 Bottom valve
26 External compensating unit
27 Oil chamber
28 Gas chamber
29 Separating piston
30 Oil passage
31 Sealing element

What is claimed is:

1. A vibration damper comprising:
a damper tube;
a damper piston disposed in the damper tube so as to be reciprocatingly movable, the damper piston being connected to a piston rod that extends out of the damper tube, wherein the damper piston movably separates a first oil-filled damper chamber on a piston rod side from a second oil-filled damper chamber remote from the piston rod; and
a bottom element disposed at an end of the damper tube so as to seal the end of the damper tube, the bottom element protruding into the end of the damper tube so as to reduce an oil volume of the second oil-filled damper chamber, wherein the bottom element includes a circumferential welding collar via which the bottom element is welded to the end of the damper tube with a weld seam,
wherein the bottom element includes a circumferential sealing collar that protrudes into the damper tube and receives a sealing element positioned against an inside of the damper tube,
wherein the bottom element includes a circumferential groove between the circumferential welding collar and the circumferential sealing collar so that the circumferential welding collar and the circumferential sealing collar are axially separated from each other in contact with the damper tube.

2. The vibration damper of claim 1 wherein the bottom element comprises a solid component.

3. The vibration damper of claim 1 wherein the end of the damper tube into which the bottom element protrudes is an open end.

4. The vibration damper of claim 1 wherein the bottom element has a surface that is substantially flat and delimits the second oil-filled damper chamber.

5. The vibration damper of claim 1 comprising a mounting eye disposed on the bottom element, wherein the mounting eye is integral with the bottom element, wherein the bottom element and the mounting eye are comprised of the same material.

6. The vibration damper of claim 1 comprising an inner tube that is received in the damper tube, the inner tube extending concentrically to the damper tube so that a ring gap exists between the damper tube and the inner tube and so that the damper piston is guided in the inner tube.

7. The vibration damper of claim 6 comprising a bottom valve disposed on a bottom end of the inner tube, wherein the bottom valve receives the end of the inner tube and supports the end of the inner tube at least radially against the damper tube.

8. The vibration damper of claim 1 comprising an external compensation unit disposed on the damper tube, the external compensation unit having an oil chamber and a gas chamber, wherein the gas chamber is separated from the oil chamber by a movable separating piston, wherein the oil chamber is fluidically connected to the second oil-filled damper chamber via an oil passage.

9. A vibration damper comprising:
a damper tube;
an inner tube that is received in the damper tube;
a damper piston movably disposed in the inner tube, the damper piston being connected to a piston rod that extends out of the damper tube, wherein the damper piston separates a first damper chamber proximal the piston rod from a second damper chamber distal the piston rod;
a bottom element disposed at an end of the damper tube so as to seal the end of the damper tube, the bottom element protruding into the end of the damper tube to reduce a volume of the second damper chamber; and
a bottom valve that is disposed on a bottom end of the inner tube and is spaced apart from the bottom element, wherein the bottom element includes a circumferential sealing collar that protrudes into the damper tube and receives a sealing element positioned against an inside of the damper tube, wherein the bottom element includes a circumferential welding collar via which the bottom element is welded to the end of the damper tube with a weld seam, wherein the bottom element includes a circumferential groove between the circumferential welding collar and the circumferential sealing collar so that the circumferential welding collar and the circumferential sealing collar are axially separated from each other in contact with the damper tube.

10. The vibration damper of claim 9 wherein the bottom element includes a circumferential sealing collar that protrudes into the damper tube and receives a sealing element positioned against an inside of the damper tube.

11. The vibration damper of claim 9 wherein the bottom element includes a circumferential welding collar via which the bottom element is welded to the end of the damper tube with a weld seam.

12. The vibration damper of claim 9 comprising a mounting eye integral with the bottom element.

13. The vibration damper of claim 9 comprising an inner tube that is received in the damper tube, the inner tube extending concentrically to the damper tube so that a ring gap exists between the damper tube and the inner tube and so that the damper piston is guided in the inner tube.

14. The vibration damper of claim 9 comprising an external compensation unit disposed on the damper tube, the external compensation unit having an oil chamber and a gas chamber, wherein the gas chamber is separated from the oil chamber by a movable separating piston, wherein the oil chamber is fluidically connected to the second damper chamber via an oil passage.

15. The vibration damper of claim 9 wherein the bottom valve receives the end of the inner tube and supports the bottom end of the inner tube at least radially against the damper tube.

16. A vibration damper comprising:
a damper tube;
a damper piston disposed in the damper tube so as to be reciprocatingly movable, the damper piston being connected to a piston rod that extends out of the damper tube, wherein the damper piston movably separates a first oil-filled damper chamber on a piston rod side from a second oil-filled damper chamber remote from the piston rod;
a bottom element disposed at an end of the damper tube so as to seal the end of the damper tube, the bottom element protruding into the end of the damper tube so as to reduce an oil volume of the second oil-filled damper chamber; and
an external compensation unit disposed on the damper tube, the external compensation unit having an oil chamber and a gas chamber, wherein the gas chamber is separated from the oil chamber by a movable separating piston, wherein the oil chamber is fluidically connected to the second oil-filled damper chamber via an oil passage,
wherein an axial distance between the bottom element and a bottom valve corresponds to an opening diameter of the oil passage.

* * * * *